United States Patent
Boudreau et al.

(10) Patent No.: US 10,210,694 B2
(45) Date of Patent: Feb. 19, 2019

(54) MULTI-PROTOCOL SMART CARD PROGRAMMING

(71) Applicant: ENTRUST DATACARD CORPORATION, Shakopee, MN (US)

(72) Inventors: Ryan Boudreau, Shakopee, MN (US); Lex Prenevost, Shakopee, MN (US); Thomas J. Wagener, Shakopee, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 69 days.

(21) Appl. No.: 15/593,412

(22) Filed: May 12, 2017

(65) Prior Publication Data

US 2017/0330404 A1 Nov. 16, 2017

Related U.S. Application Data

(60) Provisional application No. 62/335,844, filed on May 13, 2016.

(51) Int. Cl.
| | |
|---|---|
| *G07F 7/10* | (2006.01) |
| *G06K 19/06* | (2006.01) |
| *G06K 19/073* | (2006.01) |
| *G07F 7/08* | (2006.01) |
| *G06Q 20/34* | (2012.01) |

(52) U.S. Cl.
CPC ..... *G07F 7/1008* (2013.01); *G06K 19/06196* (2013.01); *G06K 19/073* (2013.01); *G06Q 20/352* (2013.01); *G06Q 20/356* (2013.01); *G07F 7/084* (2013.01)

(58) Field of Classification Search
None
See application file for complete search history.

(56) References Cited

U.S. PATENT DOCUMENTS

| | | |
|---|---|---|
| 5,266,781 A | 11/1993 | Warwick et al. |
| 5,451,037 A | 9/1995 | Lundstrom |
| 5,588,763 A | 12/1996 | Nubson et al. |
| 5,943,238 A | 8/1999 | Nioche et al. |
| 6,283,368 B1 | 9/2001 | Ormerod et al. |
| 6,695,205 B1 | 2/2004 | Lundstrom et al. |
| 6,902,107 B2 | 6/2005 | Shay et al. |
| 8,534,564 B2 | 9/2013 | Hammad |
| 8,561,894 B1 | 10/2013 | Mullen et al. |

(Continued)

OTHER PUBLICATIONS

International Search Report and Written Opinion of international application No. PCT/US2017/032318, dated Jul. 25, 2017, 11 pages provided.

*Primary Examiner* — Kristy A Haupt
(74) *Attorney, Agent, or Firm* — Hamre, Schumann, Mueller & Larson, P.C.

(57) ABSTRACT

A method and system for programming a smart card using multiple programming protocols in a single card programming station. The card can include at least two programmable chips, with each chip being programmed using a different programming protocol. Alternatively, the card can include a single programmable chip, and the chip is programmed using at least two programming protocols. The card can also include at least two programmable chips, with each chip being programmed using at least two programming protocols.

9 Claims, 3 Drawing Sheets

(56) References Cited

U.S. PATENT DOCUMENTS

| | | |
|---|---|---|
| 8,904,481 B2 | 12/2014 | Manessis et al. |
| 8,931,691 B2 | 1/2015 | Manessis et al. |
| 8,954,353 B2 | 2/2015 | Faith et al. |
| 9,129,280 B2 | 9/2015 | Bona et al. |
| 2007/0075132 A1* | 4/2007 | Kean ..................... G06K 13/00 235/380 |
| 2009/0045921 A1 | 2/2009 | Nelson et al. |
| 2012/0267435 A1 | 10/2012 | Goman et al. |
| 2013/0336426 A1* | 12/2013 | Tudosie ............... G06K 19/072 375/316 |

\* cited by examiner

MULTI-PROTOCOL SMART CARD PROGRAMMING

FIELD

This disclosure relates to programming a smart card that has one or more programmable chips on the smart card. The smart card can be a personalized plastic card, such as a financial card including a credit and debit card, an identification card, a driver's license, and other types of personalized plastic cards that are distributed to end users.

BACKGROUND

The programming of smart cards is well known. Examples of smart card programming include the systems described in U.S. Pat. Nos. 6,695,205, 6,283,368, and 5,943,238 each of which is incorporated herein by reference in its entirety.

SUMMARY

A method and system are described for programming a smart card using multiple programming protocols in a single card programming station. In one embodiment, the card can include at least two programmable chips, with each chip being programmed using a different programming protocol. In another embodiment, the card can include a single programmable chip, and the single chip is programmed using at least two programming protocols. In another embodiment, the card can include at least two programmable chips, with each chip being programmed using at least two programming protocols.

The programming of the chip(s) can be by contact programming where a programming element(s) physically contacts the chip(s) or by contactless programming using any suitable wireless technology such as radio frequency (RF) signals. If the programming is contactless using RF signals, the RF signals can be on the same carrier frequency (for example, 13.56 MHz) using a single antenna or multiple antennas.

In one embodiment, in one card programming station, a card can be programmed using one protocol (for example ISO 14443A) and also programmed using a different protocol (for example ISO 15693) potentially requiring more power. Programming using the different protocols can each be done wirelessly via contactless programming. The contactless programming can be performed using a single transmitting and/or receiving antenna, or performed using two different transmitting antennas and/or two different receiving antennas. In another embodiment, the programming using one protocol can be performed using contact programming and the programming using the other protocol can be performed wirelessly using contactless programming.

The single card programming station can be one of many card programming stations in a multi-station smart card programming system that simultaneously programs a plurality of cards at the same time, examples of which are described in U.S. Pat. Nos. 6,695,205, 6,283,368, and 5,943,238. For example, the multiple programming stations can be arranged side-by-side in a linear "elevator" style arrangement as disclosed in U.S. Pat. No. 6,695,205, or the multiple programming stations can be arranged side-by-side in a cylindrical "barrel" style arrangement as disclosed in U.S. Pat. Nos. 6,283,368 and 5,943,238. In another embodiment, the single card programming station can be used by itself to program cards one-by-one.

The single card programming station can be part of a central issuance card system that is often room sized, configured with multiple personalization/processing stations or modules simultaneously performing different personalization/processing tasks on cards, and that is generally configured to process multiple cards at once in relatively high processing volumes (for example, on the order of hundreds or thousands per hour). An example of a central issuance system is the MX and MPR line of card issuance systems available from Entrust Datacard Corporation of Shakopee, Minn. Central issuance systems are described in U.S. Pat. Nos. 6,902,107, 5,588,763, 5,451,037, and 5,266,781 which are incorporated by reference herein in their entirety. In another embodiment, the single card programming station can be part of a desktop printer that has a relatively small footprint intended to permit the desktop printer to reside on a desktop and that is designed to personalize cards in relatively small volumes, for example measured in tens or low hundreds per hour. An example of a desktop printer is the CD800 Card Printer available from Entrust Datacard Corporation of Shakopee, Minn. In still another embodiment, the single card programming station can be used as a stand-alone mechanism separate from a central card issuance system and a desktop printer.

DRAWINGS

DETAILED DESCRIPTION

As used herein, a smart card is a card that has one or more embedded integrated circuit chips that can be either a secure microcontroller or equivalent intelligence with internal memory or a memory chip alone. The embedded integrated circuit chip(s) are programmable to be able to store data. Programming of the chip(s) includes, but is not limited to, writing data to the chip(s) which data is stored on the chips and sending various commands to the chip(s) including an initialize command which typically requires a larger amount of power than simply writing data to the chip(s). Data can also be read from the chip(s). Communication with and programming of the integrated circuit chips can be via direct physical contact (i.e. a contact chip) or wirelessly (i.e. contactless chip) via suitable wireless technology such as RF signals. The smart card can be a personalized plastic card, such as a financial card including a credit and debit card, an identification card, a driver's license, and other types of personalized plastic cards that are distributed to end users.

Figure 1:
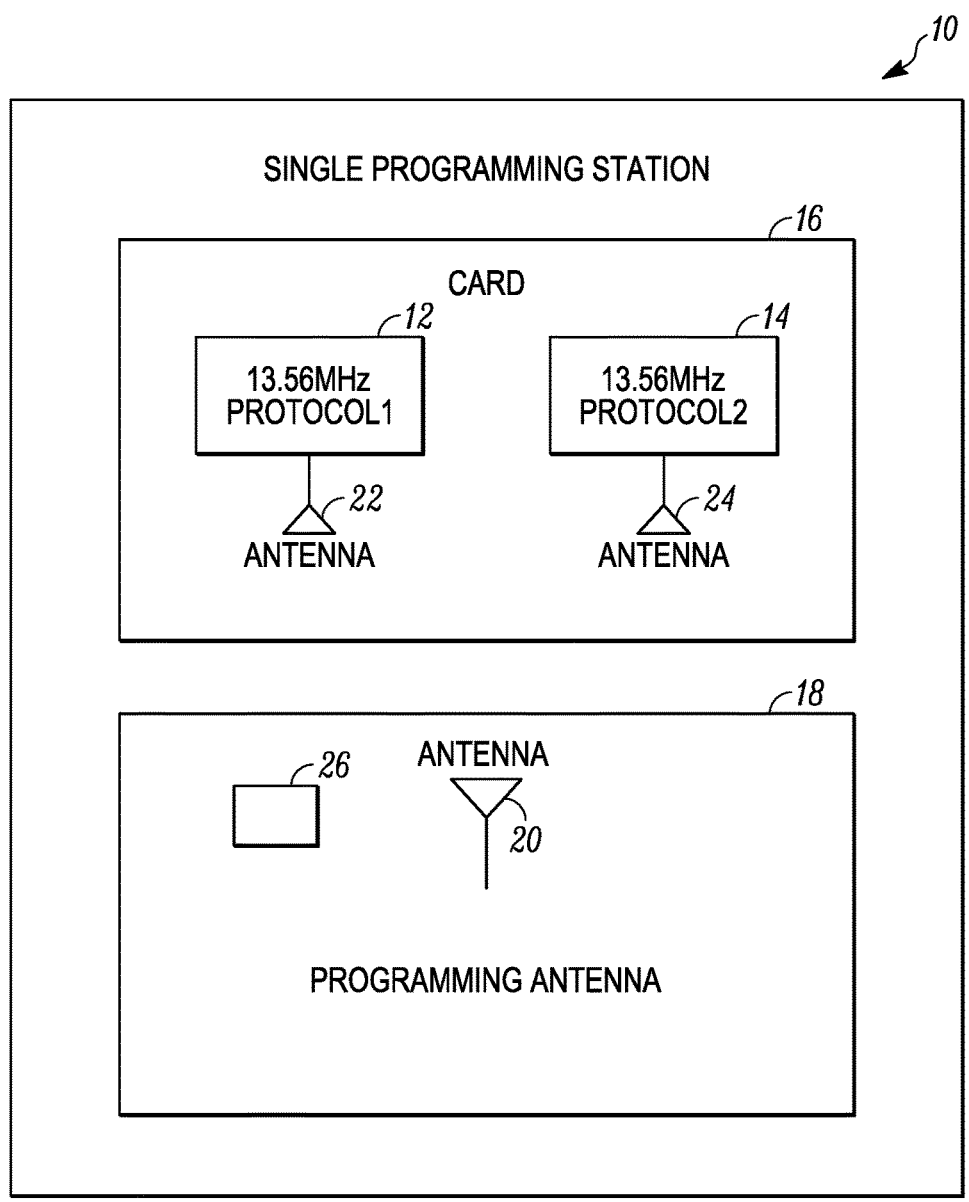
FIG. 1 illustrates a single card programming station that programs separate programmable chips on a card using different protocols.

Referring to FIG. 1, a card programming station 10 is illustrated that programs separate programmable chips 12, 14 on a card 16 using different programming protocols. The card 16 is fed into the card programming station 10 from another location, for example from a card input hopper. The card 16 is correctly positioned in the card programming station 10 to permit the programmable chips 12, 14 to be programmed via a programming mechanism 18 of the programming station 10. The chips 12, 14 can be programmed in the station 10 without having to move/relocate the card 16 to another station or coupler within the same station 10. After programming, the card 16 is fed to another location, such as an output or to another card processing station. The chips 12, 14 can be positioned at any locations on the card 16 that allow programming of the chips to occur.

In the example illustrated in FIG. 1, the programming occurs wirelessly, for example using any suitable wireless technology such as RF, in which case the programming mechanism 18 includes at least one antenna 20 that transmits RF signals used to program the chips 12, 14. In addition, each of the chips 12, 14 is connected to an antenna 22, 24 on the card 16 that receives the RF signals transmitted by the antenna 20 for programming of the chips 12, 14. In an alternative embodiment, a single antenna can be connected to both of the chips 12, 14. In still another alternative embodiment, the programming mechanism 18 can include two antennas 20, one antenna used for programming one or more of the chips 12, 14 using one type of programming protocol and one antenna used for programming one or more of the chips 12, 14 using a second type of programming protocol. The antennas 20, 22, 24 operate on the same frequency suitable for communication with the chips 12, 14 on the smart card 16. For example, the frequency can be about 13.56 MHz. In still another embodiment, one of the chips, for example the chip 12, can be programmed via contact programming using a contact programming head 26 that can be brought into physical contact with the chip it is to program, and the other chip, for example the chip 14, can be programmed via contactless programming.

In addition, the chip 12 is programmed using a first programming protocol (protocol 1) while the chip 14 is programmed using a second programming protocol (protocol 2). For example, the chip 12 can be programmed using the ISO 14443A programming protocol, and the chip 14 can be programmed using the ISO 15693 programming protocol which may require more power. It is to be realized that the chip 12 could be programmed using protocol 2 while the chip 14 is programmed using protocol 1. Programming of the chips 12, 14 using different protocols can be useful in a number of different situations. In one non-limiting example, communication with the chip 12 may be for writing static data such as the name of the card holder, an account number, or the like, on the chip 12, while communications with the chip 14 may include sending one or more commands, such as an initialization command as well as data, that may be necessary to implement a dynamic card verification value (CVV) on the card 16. Examples of dynamic CVV's on cards are described in U.S. Pat. Nos. 8,931,691, 8,904,481, 9,129,280, 8,954,353 and 8,534,564 each of which is incorporated herein by reference in its entirety.

The chips 12, 14 can be programmed in any order. For example, the chip 12 can be programmed first, followed by programming of the chip 14. Alternatively, the chip 14 can be programmed first followed by programming of the chip 12. In some embodiments, it is even possible to program the chips 12, 14 simultaneously including, but not limited to, when one chip is programmed by contact-type programming and the other chip is programmed by contactless-type programming, or when two different antennas 20 are provided. Each chip 12, 14 can also be programmed using contact- or contactless-type programming, or combinations thereof. For example, one of the chips 12, 14, for example the chip 12, can be programmed using contact-type programming, while the other chip 12, 14, for example the chip 14, can be programmed using contactless-type programming.

In one specific, non-limiting embodiment, the card 16 can be a plastic or composite financial card, such as a credit card or a debit card, one of the chips 12, 14 is what can be referred to as a "payment chip" that can be similar to the chip currently used on financial cards, and the other chip 12, 14 (referred to as the "dynamic CVV chip") can be used to facilitate the dynamic CVV on the card 16. In this embodiment, the "payment chip" can be programmed by either contact or contactless programming, while the "dynamic CVV chip" can be programmed by contactless programming.

Figure 2:
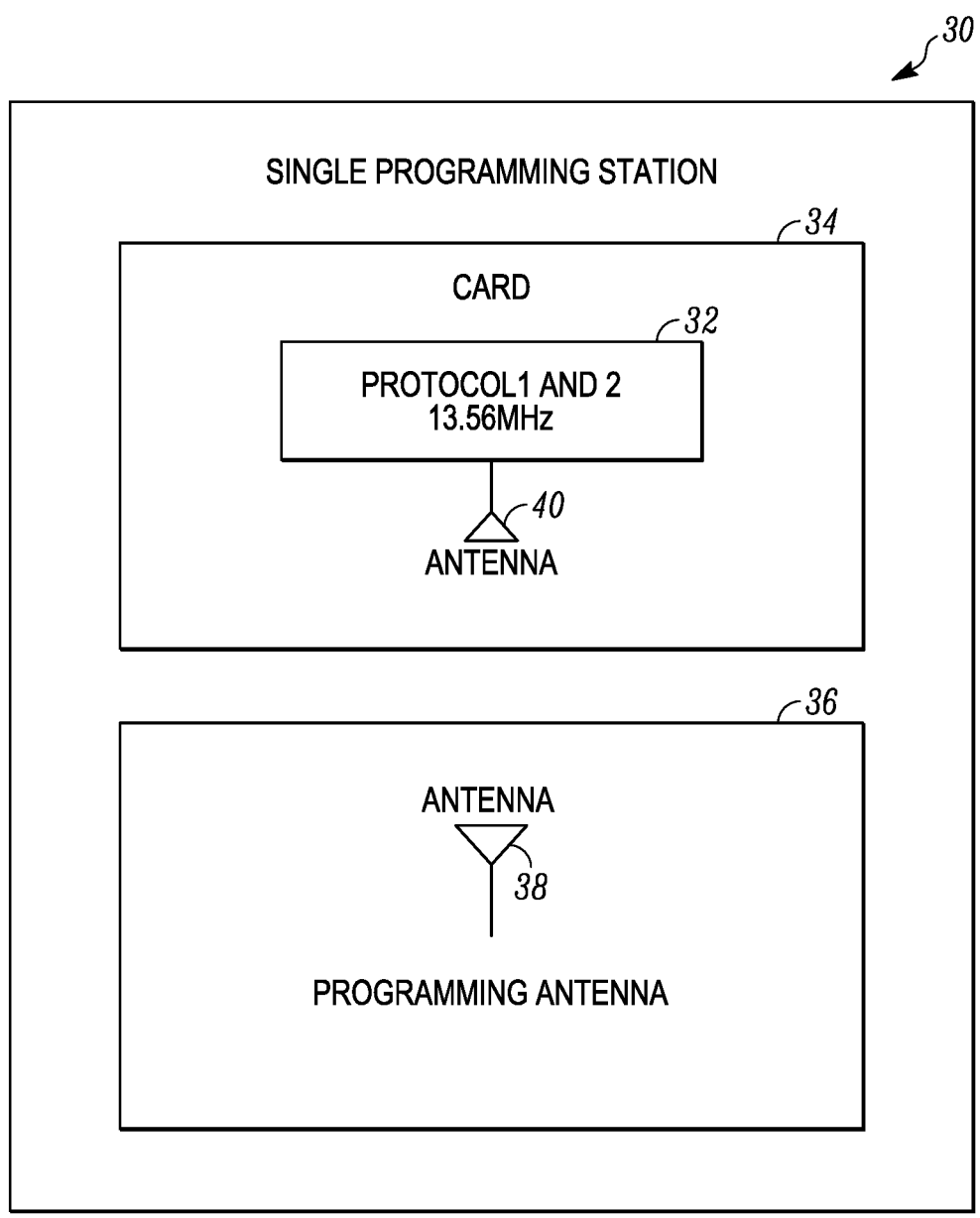
FIG. 2 illustrates a single card programming station that programs a single programmable chip on a card using different protocols.

FIG. 2 illustrates a variation of a card programming station 30 that programs a single programmable chip 32 on a card 34 using different programming protocols. The card 34 is fed into the card programming station 30 from another location, for example from a card input hopper. The card 34 is correctly positioned in the card programming station 30 to permit the programmable chip 32 to be programmed via a programming mechanism 36. After programming, the card 34 is fed to another location, such as an output or to another card processing station.

In the example illustrated in FIG. 2, the programming occurs wirelessly, for example using any suitable wireless technology such as RF, in which case the programming mechanism 36 includes at least one antenna 38 that transmits RF signals. In addition, the chip 32 is connected to an antenna 40 on the card 34 that receives the RF signals transmitted by the antenna 38 for programming of the chip 32. In an alternative embodiment, two or more antennas can be connected to the chip 32. The antennas 38, 40 operate on the same frequency suitable for programming of the chip 32 on the smart card 34. For example, the frequency can be about 13.56 MHz.

In addition, the chip 32 is programmed using a first programming protocol (protocol 1) and a second programming protocol (protocol 2). For example, the chip 32 can be programmed using the ISO 14443A programming protocol and the ISO 15693 programming protocol which may require more power. Programming of the chip 32 using different protocols can be useful in a number of different situations. In one non-limiting example, a first communication with the chip 32 may be for writing static data such as the name of the card holder, an account number, or the like, on the chip 32, while a second communication with the chip 32 may include sending one or more commands, such as an initialization command as well as data, that may be necessary to implement a dynamic card verification value (CVV) on the chip 32. Examples of dynamic CVV's are described in U.S. Pat. Nos. 8,931,691, 8,904,481, 9,129,280, 8,954, 353 and 8,534,564 each of which is incorporated herein by reference in its entirety.

The programming of the chip 32 can occur in any order. For example, the chip 32 can be programmed with the first protocol, followed by programming of the chip 32 with the second protocol. Alternatively, the chip 32 can be programmed with the second protocol followed by programming of the chip 32 with the first protocol. In some embodiments, it is even possible to program the chip 32 with the two protocols simultaneously including, but not limited to, when the chip is programmed by contact-type programming and is also programmed by contactless-type programming, or when two different antennas 38 are provided.

In another embodiment (not illustrated), the card 34 can include at least two programmable chips, with each chip being programmed using at least two programming protocols.

Although the embodiments illustrated in FIGS. 1 and 2 are shown as implementing RF communications with the chips 12, 14, 32, the chips 12, 14, 32 may alternatively be contact chips requiring direct physical contact between the programming mechanism 18, 36 and the chips 12, 14, 32 to achieve the programming. In addition, the programming stations 10, 30 may also be configured to perform both contactless programming and contact programming. Examples of contact programming and mechanisms for both contactless programming and contact programming are disclosed in U.S. Pat. No. 6,283,368.

In one example implementation, a plurality of the programming stations 10, 30 can be arranged into a cylindrical or barrel configuration similar to the configurations disclosed in U.S. Pat. Nos. 6,283,368, and 5,943,238. In such a configuration, the distance between the antenna 20, 38 and the card 16, 34 in each programming station 10, 30 is equal to or less than about 0.08 inches, at an antenna power of a maximum of 28.1 uV/m (at 30 meter measurement) at 13.56 MHz. In other embodiments, the distance between the antenna and the card can be equal to or less than about 0.10 inches. Applicant believes that the distance between the antenna and the card when arrayed in a linear "elevator" style arrangement, such as disclosed in U.S. Pat. No. 6,695,205, would also be equal to or less than about 0.10 inches, or equal to or less than about 0.08 inches, although there may be a small difference in antenna power in a linear "elevator" style arrangement. In conventional systems where a plurality of programming stations are arranged in a barrel configuration and in a linear "elevator" style arrangement, the distance between the antenna and the card in each programming station is about 0.196 inches.

Figure 3:
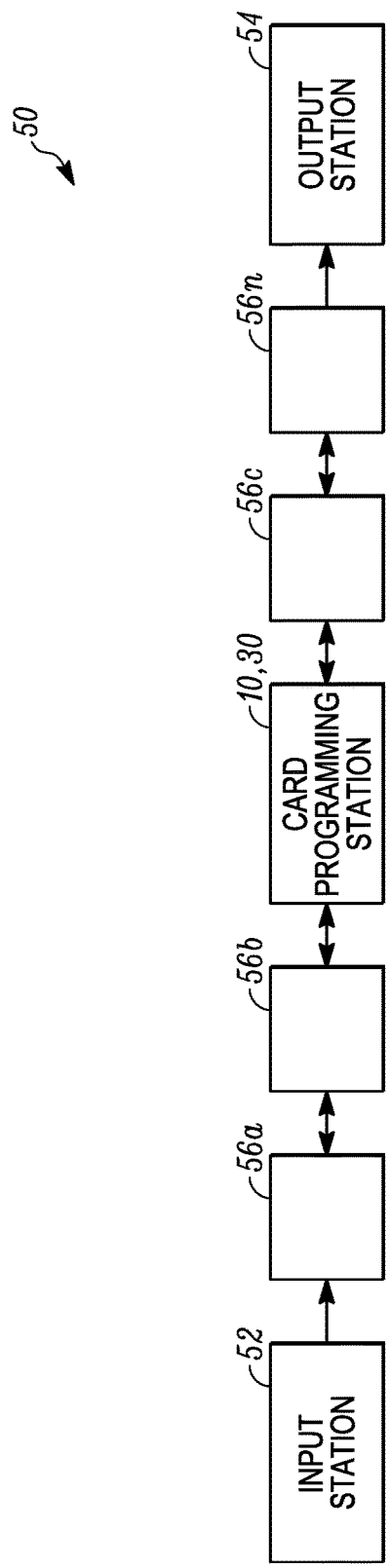
FIG. 3 is a schematic illustration of a card processing system that can include any one of the card programming stations described herein along with additional card personalization/processing stations.

The card programming station 10, 30 can be used with one or more additional card personalization/processing stations. Any additional card personalization/processing stations (if used) can be provided upstream and/or downstream of the station 10, 30 whereby additional card personalization/processing can occur prior to and/or after programming of the chips in the station 10, 30. For example, referring to FIG. 3, an example card processing system 50 in the form of a central issuance system is illustrated that includes an input station 52 that inputs cards one-by-one into the system 50 for processing, an output station 54 that receives and collects processed cards, and the card programming station 10, 30 between the input station 52 and the output station 54. In between the input station 52 and the output station 54, additional card personalization/processing stations 56a, 56b, 56c ... 56n can be provided. The additional card personalization/processing stations can be any stations used to personalize/process plastic cards such as financial cards. For example, the additional card personalization/processing stations 56a,b,c ... n can include, but are not limited to, an embossing station that embosses characters on the card; an indenting station that indents characters on the card; a print station that performs printing on the card; a laser station that performs laser processing such as laser marking on the card; a laminator station that applies a laminate to a portion of or the entire surface of the card; a topcoat station that applies a topcoat to a portion of or the entire surface of the card; a quality control station that checks the quality of the personalization/processing applied to the card; a security station that applies a security feature, such as a holographic foil patch, to the card; a magnetic stripe station (if a magnetic stripe is also present on the card) that reads data from and/or writes data to a magnetic stripe on the card; and other stations. If for some reason additional programming of the chips 12, 14 is required, one of the additional card personalization/processing stations 56a, 56b, 56c ... 56n may also be a card programming station that functions similarly to the station 10, 30.

The cards are transported from the input station 52 to the output station 54 to and through the station 10, 30 and the additional card personalization/processing stations 56a,b,c ... n using suitable card transport mechanisms such as transport rollers and/or transport belts. In some instances, portions of the card transport mechanism may be reversible to permit reverse transport of cards.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of producing a smart card, comprising:
   performing at least one personalization/processing operation on the smart card;
   programming a first programmable chip on the smart card in a programming station using a first programming protocol; and
   programming a second programmable chip on the smart card in the programming station using a second programming protocol, wherein the programming of the second programmable chip is performed using contactless programming;
   wherein the programming of the first programmable chip is performed using contactless programming using radio frequency signals at a first frequency, the programming of the second programmable chip is performed using radio frequency signals at a second frequency; and the first frequency equals the second frequency.

2. The method of claim 1, wherein the smart card further comprises a magnetic stripe and wherein the method further comprises writing data onto the magnetic stripe.

3. The method of claim 1, wherein performing at least one personalization/processing operation on the smart card comprises at least one of the following: embossing, printing, and laser marking.

4. The method of claim 1, wherein the programming of the first programmable chip is performed via a first antenna connected to the first programmable chip, and the programming of the second programmable chip is performed via a second antenna connected to the second programmable chip.

5. A method of producing a smart card, comprising:
   performing at least one personalization/processing operation on the smart card;
   programming a first programmable chip on the smart card in a programming station using a first programming protocol; and
   programming a second programmable chip on the smart card in the programming station using a second programming protocol, wherein the programming of the second programmable chip is performed using contactless programming;
   wherein the first programming protocol utilizes a first power, the second programming protocol utilizes a second power, and the first power differs from the second power.

6. A method of programming a smart card in a programming station, comprising:

programming a first programmable chip on the smart card in the programming station using a first programming protocol via a first antenna connected to the first programmable chip; and programming a second programmable chip on the smart card in the programming station using a second programming protocol via a second antenna connected to the second programmable chip;

wherein the programming of each of the first programmable chip and the second programmable chip is performed using contactless programming.

7. The method of claim 6, wherein the first programmable chip is a payment chip, the second programmable chip is a dynamic card verification value chip; and the smart card is a financial card.

8. A method of programming a smart card in a programming station, comprising:

programming a programmable chip on the smart card in the programming station using a first programming protocol; and programming the programmable chip on the smart card in the programming station using a second programming protocol.

9. The method of claim 8, wherein the programming of the programmable chip using the first programming protocol and using the second programming protocol is performed via an antenna connected to the programmable chip.

\* \* \* \* \*